Jan. 21, 1930.  W. S. McKINLEY  1,744,406
DRAW POT
Filed Sept. 23, 1925

INVENTOR.
William S. McKinley.
Frank Fraser
ATTORNEY.

Patented Jan. 21, 1930

1,744,406

UNITED STATES PATENT OFFICE

WILLIAM S. McKINLEY, OF SHREVEPORT, LOUISIANA, ASSIGNOR TO LIBBEY-OWENS GLASS COMPANY, OF TOLEDO, OHIO, A CORPORATION OF OHIO

DRAW POT

Application filed September 23, 1925. Serial No. 58,042.

This invention relates to improvements in glass tank construction, and more particularly to an improved form of draw pot.

The object of the present invention is to provide a draw pot with means to prevent leakage of molten glass at the junction of the tank and draw pot.

A further object of the invention is to provide for a more continuous communicating inner surface at the junction of the tank and draw pot.

Other objects and advantages will become apparent during the course of the following description.

In the ordinary glass tank construction for manufacturing sheet glass, the working end thereof, known as the "cooling chamber," joins the open end of a draw pot by the two ends being merely butted together. It is almost impossible to form a joint in this manner which will prevent the leakage of the molten glass thereabove, no matter how smooth the surfaces are forming the joint. With the improved construction covered by this invention an overlapping joint is provided for at the junction of these two ends.

Figure 1:
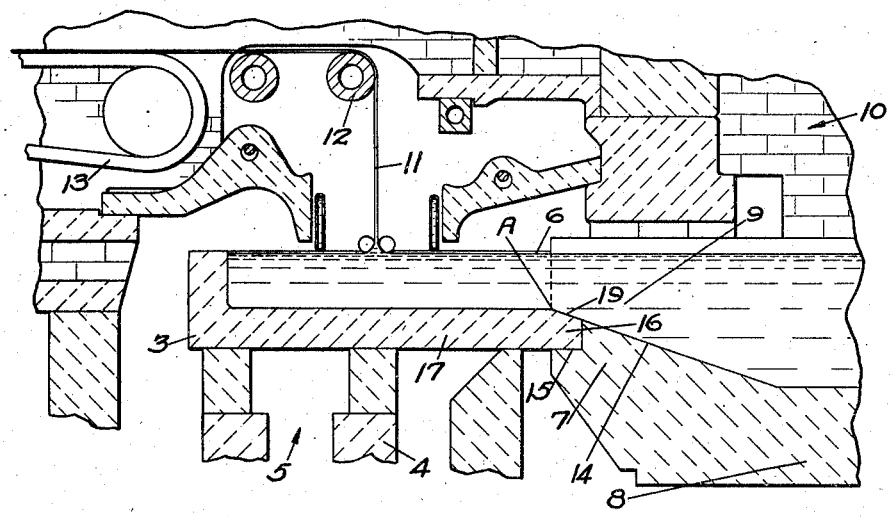
Figure 3:
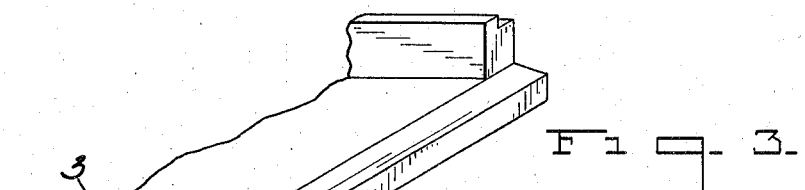
Figure 2:
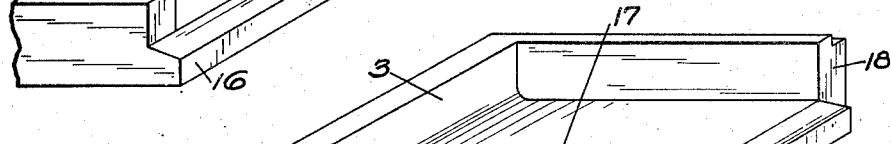
Figure 4:
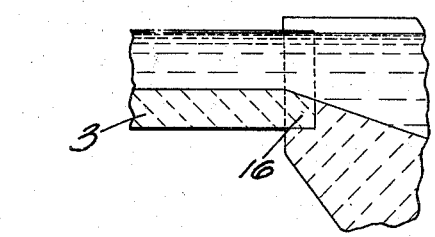

In the accompanying drawings wherein like numerals are employed to designate like parts throughout the same, Fig. 1 is a vertical longitudinal section through a portion of a glass tank furnace and a sheet glass drawing apparatus, Fig. 2 is a perspective view of the improved draw pot showing the overlapping bottom extension, and Figs. 3 and 4 are modified forms of the invention.

In Fig. 1, the numeral 3 refers to a draw pot supported upon stools 4, positioned within a heated chamber 5. The end 6 of the draw pot is in open communication with the gooseneck 7 of a cooling chamber 8. Molten glass 9 is supplied to the cooling chamber and draw pot from the melting end of the tank furnace 10. From the molten glass in the draw pot 3 a sheet of glass 11 is vertically drawn over a bending roll 12 by means of the drawing mechanism 13.

The gooseneck 7 provides a gradual upward slope 14 to glass contacting surface of the cooling chamber bottom. The bottom of the cooling chamber, at the upper end of this slope, is provided with a suitably shaped slot 15 extending substantially throughout its width. The slot 15 is adapted to bodily receive an outwardly extending lip 16 preferably formed by the continuation of the bottom 17 beyond the sidewalls 18 of the draw pot. The upper surface 19 of the lip 16 is beveled off in such a manner to substantially complete the sloping bottom 14 of the cooling chamber when the pot lip is disposed within the slot 15 thereof. The inner surfaces of the glass tank and draw pot, with this preferred form of construction, substantially join at a common level "A" provided by the beveled lip 16 of the draw pot. In joining the glass tank and draw pot in this manner a more desirable connection between the two is attained.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A glass tank furnace, including a cooling chamber, a draw pot, a gooseneck attached to said cooling chamber, the inner bottom surface having a gradual upward slope terminating at a slot in the end thereof, and an extending lip on the draw pot bottom disposed within said slot, the upper surface of said lip beveled off to conform with the slope of the gooseneck bottom, forming a continuation thereof.

2. A glass tank furnace including a cooling chamber provided with a slot and a draw pot having an extension fitting in said slot, the upper surfaces of said chamber and draw pot above the end of the cooling chamber being inclined and substantially continuous.

3. A glass tank furnace including a cooling chamber having a flat inclined bottom surface and a draw pot also having a flat inclined bottom surface aligning with and arranged in the same plane as the inclined bottom surface of said chamber.

4. A glass tank furnace including a cooling chamber having an inclined bottom surface and provided with a slot, and a draw pot having an extended lip fitting within said slot and bevelled to align with the inclined surface of said chamber.

Signed at Shreveport, in the parish of Caddo, and State of Louisiana, this 15th day of September, 1925.

WILLIAM S. McKINLEY.